Figure 1:
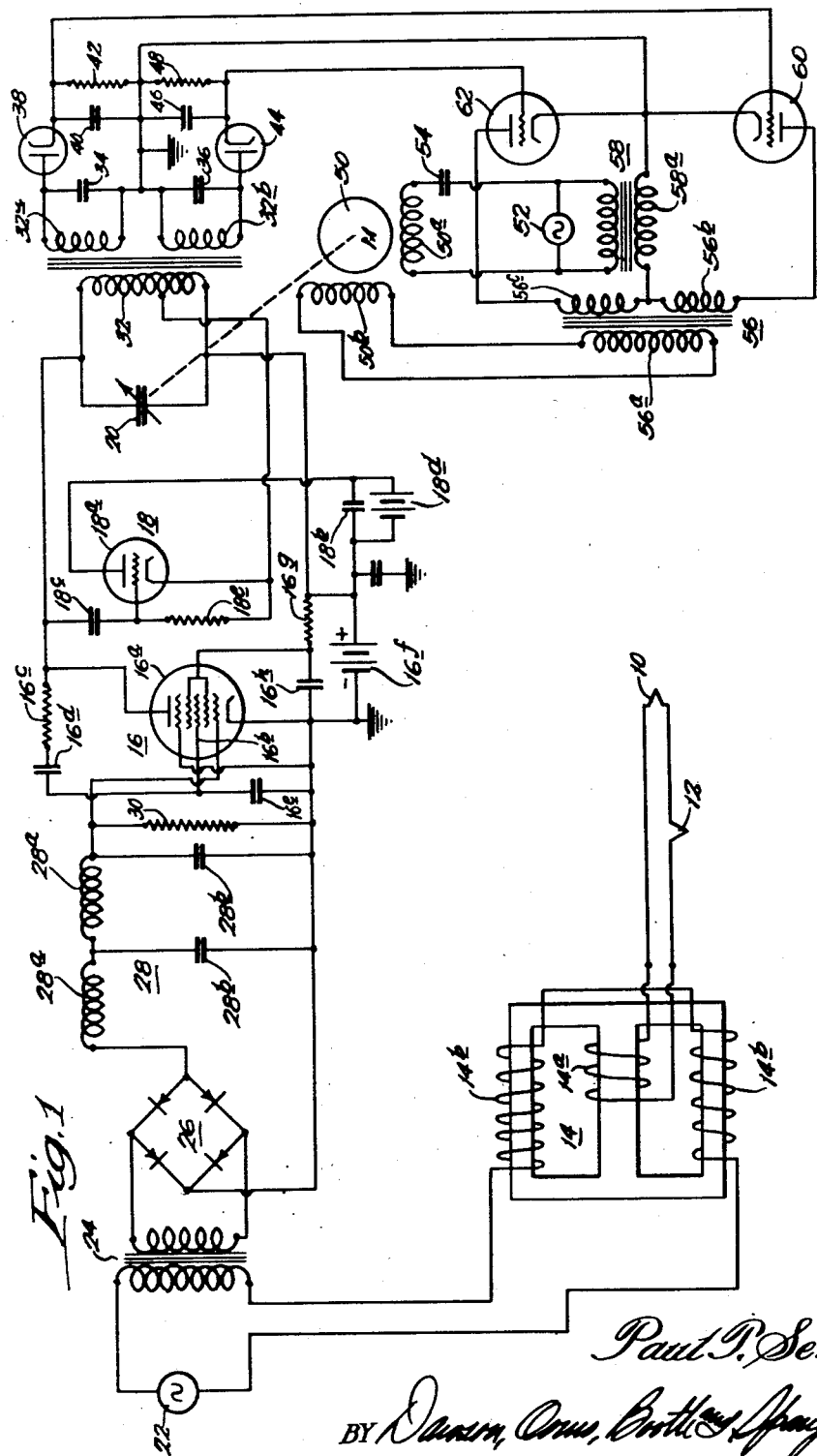

Sept. 11, 1951      P. T. SEMM      2,567,896

VOLTAGE MEASURING DEVICE USING FREQUENCY MODULATION

Filed Feb. 15, 1949      2 Sheets-Sheet 1

INVENTOR:
Paul P. Semm,
BY   *(signature)*
ATTORNEYS.

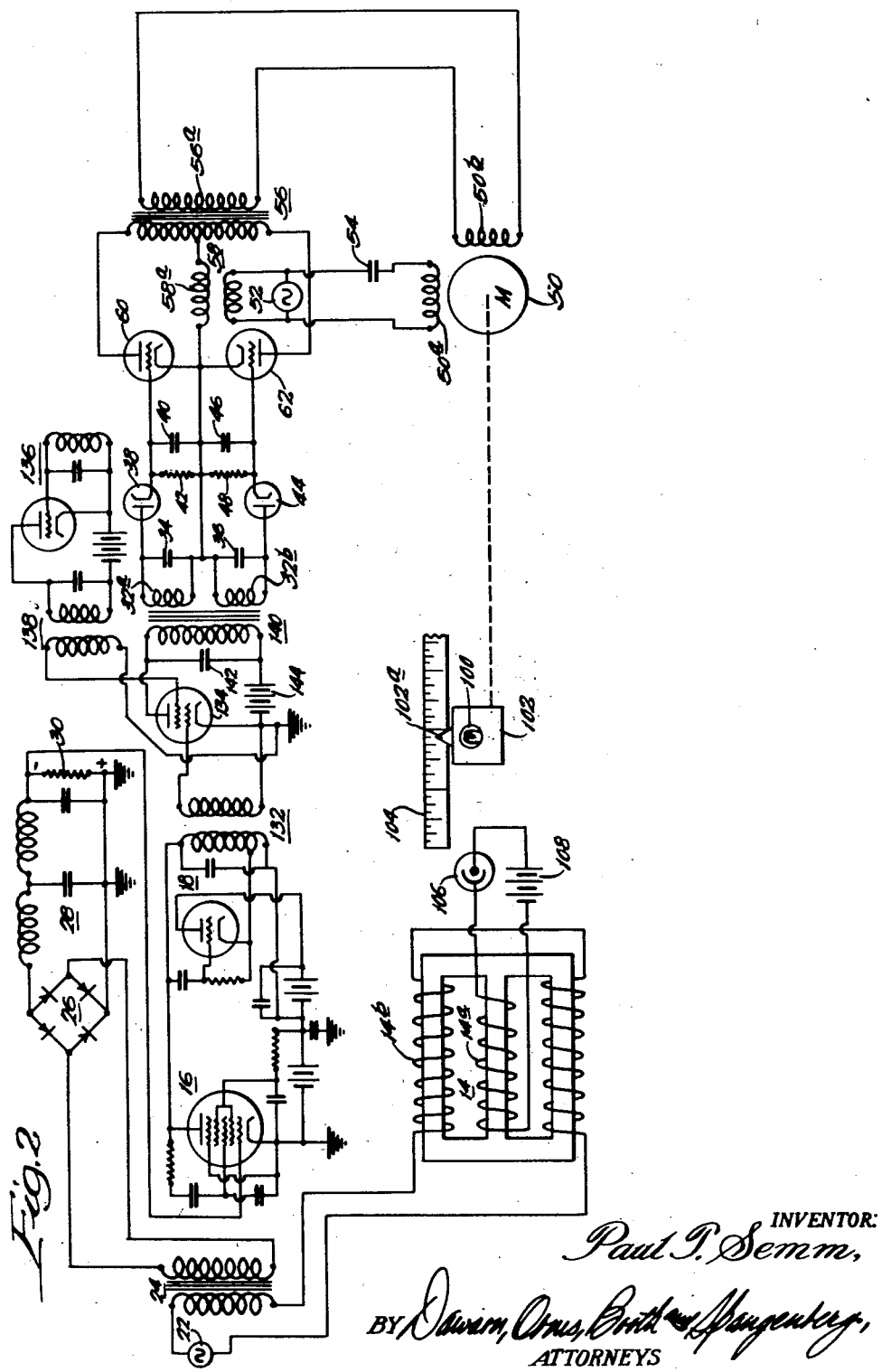

Patented Sept. 11, 1951

2,567,896

UNITED STATES PATENT OFFICE 2,567,896

VOLTAGE MEASURING DEVICE USING FREQUENCY MODULATION

Paul T. Semm, Chicago, Ill., assignor to Wheelco Instruments Company, Chicago, Ill., a corporation of Illinois Application February 15, 1949, Serial No. 76,564

4 Claims. (Cl. 171—95)

My invention relates to a highly stable and yet inexpensive measuring device capable of measuring slowly varying minute currents or quantities represented by such currents.

Accurate measurement of slowly varying minute electrical currents is complicated by the inability of conventional devices to amplify these currents without introducing intolerable errors. In accordance with the present invention this problem is overcome by impressing the minute current to be measured on the saturating winding of a saturable reactor. A reactance tube is energized in response to the impedance of the saturable winding of the reactor and the frequency of an oscillator thereby controlled. Calibrated means are provided to restore this frequency to a preselected value, thereby providing a measure of the initial small current or a quantity the current represents.

It is therefore the general object of the present invention to provide an improved measuring system for minute slowly varying currents or values represented by such currents.

Further it is an object of the present invention to provide an improved measuring system for minute slowly varying currents that is simple and inexpensive in construction and yet highly stable and accurate in operation.

Another object of the present invention is to provide a measuring system for minute slowly varying currents that utilizes readily calibrated indicating elements.

Still another object of the present invention is to provide an improved device for measuring minute currents that incorporates calibrated feedback means capable of resetting the mechanism to a preselected condition of operation.

The novel features which I believe to be characteristic of my invention are set forth with particularity in the appended claims. My invention itself, however, both as to its organization and method of operation, together with further objects and advantages thereof may be best understood by reference to the following description taken in connection with the accompanying drawings in which Figures 1 and 2 are schematic diagrams of two embodiments of the invention.

In the embodiment of the invention shown in Figure 1, the quantity to be measured is the temperature of the hot thermo-couple junction 10. This junction may, for example, be exposed to a flame. Briefly, the minute current resulting from the temperature difference between this junction and the fixed temperature junction 12 is impressed on the saturating winding 14a of the saturable reactor 14. The apparent reactance of reactance tube circuit 16 is controlled in response to the impedance of the saturable winding 14b, thereby tending to vary the frequency oscillator 18. Calibrated condenser 20 is rotated in response to this frequency to restore the preselected value. The setting of condenser 20 then measures the temperature of hot junction 10.

The saturable reactor 14 has a rectangular magnetic core with two rectangular windows defining a center leg and two side legs. The saturating winding 14a is wound on the center leg and is in series circuit relation with the thermocouple junctions 10 and 12. The saturable winding 14b is equally disposed on the two outside legs of reactor 14. The turns of winding 14b are wound to produce no flux in the center leg when current flows in that winding.

A source of alternating potential 22 is connected in a series circuit across the primary winding of transformer 24 and the saturable winding 14b. The voltage of the source 22 distributes itself across the primary of transformer 24 and the saturable winding 14b in accord with the relative impedances reflected by these windings. Consequently the voltage induced in the secondary winding of transformer 24 varies in accord with the impedance of winding 14b and hence the current flow through saturating winding 14a.

The rectifier 26 and the filter 28 convert the alternating voltage induced in the secondary winding of transformer 24 to an unidirectional voltage having magnitude determined by the amplitude of the alternating induced voltage. The rectifier 26 is of the bridge type. The secondary of transformer 24 is connected across one set of opposed terminals of the bridge and the input of filter 28 is connected across the other set of opposed terminals. The filter 28 has a pair of series connected smoothing inductors 28a and a pair of smoothing capacitors 28b.

The unidirectional voltage appearing across resistance 30 is impressed across the cathode-control electrode space path of tube 16a. This varies the mutual conductance of tube 16a and thereby controls the effective reactance it presents to the oscillator 18.

The tube 16a appears as a reactance to oscillator 18 because the current it draws is 90° out of phase with the applied anode-cathode voltage. Control over this phase displacement is achieved by the auxiliary control electrode 16b. This electrode is connected across the cathode-anode space path of tube 16a by the resistor 16c and the capacitors 16d and 16e. The relative values of resistor 16c and capacitors 16d and 16e are chosen to cause the mutual conductance of tube 16a to vary at a 90° phase advance in relation to the phase of the alternating voltage appearing across the cathode-anode space path thereof. Since the mutual conductance varies at the frequency of the cathode-anode voltage but with a 90° phase advance, and the magnitude of this variation is controlled by the voltage across resistor 30, the tube 16a appears as a capacitive reactance of value fixed by the voltage across resistor 30.

Screen grid potential is applied to tube 16a by source 16f and resistor 16g. Shunting capacitor 16h defines a low impedance path for high frequency voltage between the screen grid and cathode of tube 16a.

Source 16f further impresses the unidirectional voltage across the cathode-anode space path of tube 16a. This circuit can be traced from source 16b through inductor 32 to the anode-cathode space path of tube 16a.

Oscillator 18 is of the Hartley type having a tapped tuning inductor 32 and a triode tube 18a. The anode of tube 18a is connected to one end of inductor 32 through capacitor 18b. The control electrode of tube 18a is connected to the opposite end of inductor 32 through capacitor 18c. The cathode of tube 18a is connected directly to the tap on inductor 32.

Cathode-anode space path voltage is supplied to tube 18a by source 18d which is connected to the anode of that tube directly and to the cathode through inductor 32. Resistance 18e acts as a grid leak in conjunction with the capacitor 18c to provide grid bias for tube 18a.

The frequency of the oscillations produced by oscillator 18 is determined by the resonant frequency of the circuit defined by capacitor 20, inductor 32 and the reactance presented by tube 16a. Since the latter reactance varies with the voltage across resistance 30 and hence the temperature of thermo-couple junction 10, the frequency of oscillation of tube 18a tends to vary in accord with this temperature.

Two like secondary windings 32a and 32b are mounted in mutual inductive relation with the inductor 32. Winding 32a is tuned to a frequency slightly higher than the preselected frequency by the capacitor 34. Winding 32b is tuned to a frequency slightly lower than the preselected frequency by the capacitor 36.

The rectifier 38 is connected across capacitor 34 and in series relation with capacitor 40, thus producing a unidirectional voltage across capacitor 40 in accord with the magnitude of the alternating voltage across capacitor 34. Similarly, rectifier 44 is connected in series with capacitor 46 across the capacitor 36 to produce a unidirectional voltage across capacitor 46 in accord with the alternating voltage across capacitor 36.

Resistances 42 and 48 define leakage paths for the charges on capacitors 40 and 46, thus enabling the voltage across these capacitors to follow changes in the magnitude of the voltages across capacitors 34 and 36.

The capacitor 20 is rotated by the split phase induction motor 50. The winding 50a of this motor is connected directly to alternating voltage source 52 to provide uniform energization thereof. Capacitor 54 is interposed in this circuit to cause the current in winding 50a to lead the voltage of source 52 by substantially 90 degrees.

The other winding 50b of motor 50 is energized from secondary winding 56a of transformer 56. As will be described in further detail hereafter, the magnitude and phase of the voltage induced in this winding is such as to rotate motor 50 in the direction required to restore a predetermined frequency in the oscillator 18.

The voltage induced in winding 56a is determined by the net current flow in the two primary windings 56b and 56c. Current flow in primary 56b follows the path defined by secondary 58a of transformer 58 and the cathode-anode space path of tube 60. This current induces a voltage in secondary 56a tending to rotate motor 50 in one direction. Current flow in primary 56c follows the path defined by secondary 58a of transformer 58 and the cathode-anode space path of tube 62. This current tends to rotate motor 50 in the opposite direction.

The relative effects of windings 56b and 56c depends on the relative conductivities of tubes 60 and 62 and hence upon the relative cathode-control electrode voltage of each. The cathode-control electrode space paths of these tubes are connected across resistors 42 and 48, respectively.

When the frequency of oscillator 18 is at a preselected frequency, the windings 32a and 32b are tuned substantially like amounts on each side of this frequency and the voltages across resistors 42 and 48 are the same. Tubes 60 and 62 then have like conductivity and windings 56b and 56c exert like tendencies to rotate motor 50. However these windings tend to rotate the motor in opposite directions in that the net motor rotating effort is zero.

Actually, the voltage induced in winding 56a is zero when oscillator 18 is at the preselected frequency since the magetomotive forces exerted by windings 56b and 56c are equal and opposite.

When the frequency of oscillator 18 departs from the preselected value towards the frequency of tuning of winding 32a, the voltage across resistance 42 increases and the voltage across resistance 48 decreases. This causes tube 60 to become more conductive and tube 62 to become less conductive. The magnetomotive force of winding 56b then overpowers the opposite magnetomotive force of winding 56c, thereby inducing the voltage in winding 56a tending to rotate motor 50.

Motor 50 and capacitor 20 are so related that the rotation of the capacitor in response to this departure from the preselected frequency tends to tune oscillator 18 towards that frequency. Consequently, the motor rotation continues until the preselected frequency of oscillation is restored. The setting of capacitor 20 then is a measure of the change causing the initial variation in frequency.

Changes tending to cause the frequency of oscillator 18 to change in the opposite direction from the preselected frequency cause winding 56c to overpower winding 56b and rotate motor 50 in the opposite direction until the preselected frequency is restored. The setting of capacitor 20 then is a measure of the initial effect tending to cause detuning.

The capacitor 20 is adjusted automatically as required to overcome the effects tending to detune oscillator 18 from the preselected frequency. Variation in the voltage across resistance 30 is one of these effects since it varies the mutual conductance of reactance tube 16a. Since this voltage is determined by the temperature of thermo-couple junction 10, the setting of capacitor 20 is a measure of that temperature. If desired, the condenser scale may be calibrated in terms of temperature to permit direct readings of thermo-couple temperature.

The apparatus of the present invention effectively measures the minute slowly varying current in thermo-couple 10 without requiring choppers, highly stable unidirectional voltage sources, and like devices normally necessary for this purpose. Moreover, a readily calibrated device, condenser 20, provides a direct reading of the desired quantity, such as the temperature of junction 10.

Figure 2 shows an alternative embodiment of the present invention. Parts like those of the embodiment of Figure 1 are indicated by like reference numbers.

The structure of Figure 2 is intended to measure the intensity of the light output of the lamp bulb 100 which is suitably energized by means not shown. The bulb 100 is mounted on a shiftable carriage 102 which carries a pointer 102a for co-operation with the scale 104. A photocell 106 is mounted in fixed position relative to the scale 104 and thus receives light in amount dependent on the light output of bulb 100 and the position of carriage 102.

Current flows through the saturating winding 14a of saturable reactor 14 in accord with the light received by the photocell 106. The path for this current may be traced from winding 14a, through battery 108 and cell 106 back to the winding 14a.

As will be described in further detail hereafter, the measuring system of the present invention acts to shift carriage 102 until the current flow in winding 14a reaches a preselected value. The position of the carriage relative to the scale 104 is then a measure of the light output of bulb 100.

In the apparatus of Figure 2, the minute slowly varying unidirectional current through photocell 106 is converted to a substantial unidirectional voltage across resistance 30 as in the structure of Figure 1. This voltage is applied to reactance tube circuit 16 to vary the frequency of oscillator 18 as in the structure of Figure 1. The resultant oscillations appear in output transformer 132.

The secondary winding of output transformer 132 feeds the control grid of the mixer tube 134. The injection grid of this tube receives oscillations of fixed frequency from tuned-plate tuned-grid type oscillator 136. Oscillations from the latter oscillator are applied to the injection grid through transformer 138.

Mixer tube 134 produces oscillations of frequency determined by the difference between the frequencies of oscillators 18 and 136. Consequently even a small percentage change in the frequency of oscillator 18 produces a large percentage change in the difference frequency and is readily detected by the discriminator circuit defined by tubes 38 and 44.

Oscillations from mixer 134 are applied to the input windings 32a and 32b of the discriminator by the transformer 140. The primary of this transformer is connected in series circuit with the cathode-anode space path of tube 134 and is tuned by the capacitor 142. Battery 144 provides unidirectional cathode-anode space path voltage for tube 134. Discriminator input windings 32a and 32b form secondaries to the transformer 140.

The discriminator input windings 32a and 32b operate to rotate motor 50 selectively in the same manner that the like windings of Figure 1 rotate the motor 50 of that figure. Consequently, as the frequency of oscillator 18 departs from a predetermined value, the motor 50 is rotated in one direction or the other depending on the direction of the deviation.

The motor 50 is adapted to shift carriage 102 as it rotates. This may be accomplished by many means well known in the art. One method, for example, would be to have carriage 102 ride on a lengthy screw rotated by the motor 50.

In the structure of Figure 2, the circuit elements are designed so that motor 50 shifts carriage 102 towards photocell 106 when the current flow through that photocell decreases and away from photocell 106 when the current flow therethrough increases. The motor accordingly shifts carriage 102 until the current in winding 14a is substantially a predetermined value.

The sensitivity of the structure of Figure 2 is increased by the relatively great change in frequency at transformer 140 associated with the small change in frequency of oscillator 18 and correspondingly small change in the current in photocell 106. This provides a high degree of amplification with correspondingly small departures of the current in winding 14a from the value corresponding to the preselected frequency and high degree of accuracy of measurement.

It will, of course, be understood that amplifiers may be provided between the oscillator and discriminator of the structure of the present invention to increase the amplification and thereby the accuracy of measurement. Moreover, if increased freedom from supply voltage variations is desired, an amplitude limiter may be used. Preferably, this limiter is placed before the discriminator.

While I have shown and described specific embodiments of my invention, it will, of course, be understood that I do not wish to be limited thereto since many variations and alternative embodiments may be made without departing from the spirit and scope thereof. I intend by the appended claims to cover all such variations and alternative embodiments as fall within the spirit and scope of my invention.

What I claim as new and desire to secure by Letters Patent of the United States is:

1. A measuring system comprising in combination a saturable reactor having a saturating winding and a saturable winding, means to apply current to said saturating winding, a source of alternating electromotive force, a transformer having primary and secondary windings, means defining a series circuit through said source, said primary winding and said saturable winding, an oscillator, means to vary the frequency of said oscillator in response to the magnitude of the induced voltage in said secondary winding, a second oscillator, and means responsive to the difference in frequency between said oscillators operative to vary the value of said current in direction to maintain said difference frequency at a preselected value.

2. A measuring device comprising a saturable reactor having a saturating winding and a saturable winding, means to cause current flow in said saturating winding, an oscillator, means to vary the frequency of said oscillator in accord with the impedance of said saturable winding, and calibrated elements operative in response to said frequency to vary said current in direction to restore a preselected value thereof.

3. A measuring device for a slowly varying current comprising a saturable reactor having a saturating winding and a saturable winding, a transformer having primary and secondary windings, a source of alternating potential, means defining a series circuit through said source, said primary winding, and said saturable winding, an oscillator having a tuned circuit having a calibrated reactance element, means responsive to the induced potential in said secondary winding and operative to vary the value of a reactance in said circuit, thereby altering the frequency of said oscillator, and means responsive to the frequency of said oscillator to adjust said calibrated reactance element to restore said frequency to a preselected value.

4. A measuring device for a slowly varying current comprising in combination a saturable reactor having a saturating winding and a saturable winding, said saturating winding being adapted to carry said current, a transformer having primary and secondary windings, a source of alternating potential, means defining a series circuit from said source through said primary winding and said saturable winding, means operative to produce an alternating potential of frequency determined by the voltage induced in said secondary winding, and elements operative in response to said frequency.

PAUL T. SEMM.

REFERENCES CITED

The following references are of record in the file of this patent:

UNITED STATES PATENTS

| Number | Name | Date |
| --- | --- | --- |
| 2,026,758 | Turner | Jan. 7, 1936 |
| 2,153,377 | Kramer | Apr. 4, 1939 |
| 2,423,616 | Rath | July 8, 1947 |
| 2,457,792 | Wild et al. | Dec. 28, 1948 |
| 2,464,193 | Wild | Mar. 8, 1948 |